United States Patent [19]

Messingschlager

[11] Patent Number: 4,907,745
[45] Date of Patent: Mar. 13, 1990

[54] FUEL INJECTION VALVE AND METHOD FOR ADJUSTING IT

[75] Inventor: Anton Messingschlager, Staffelbach, Fed. Rep. of Germany

[73] Assignee: Robert Bosch GmbH, Stuttgart, Fed. Rep. of Germany

[21] Appl. No.: 196,521

[22] Filed: May 20, 1988

[30] Foreign Application Priority Data

Jul. 17, 1987 [DE] Fed. Rep. of Germany ....... 3723698

[51] Int. Cl.⁴ ............................................. F02M 51/06
[52] U.S. Cl. ..................................... 239/463; 239/585
[58] Field of Search ............ 239/585, 504, 463, 288.5, 239/464, 467

[56] References Cited

U.S. PATENT DOCUMENTS

| | | | |
|---|---|---|---|
| 4,235,375 | 11/1980 | Melotti | 239/585 |
| 4,365,746 | 12/1982 | Tanasawa et al. | 239/585 |
| 4,403,741 | 9/1983 | Moriya et al. | 239/585 |
| 4,423,841 | 1/1984 | Palma | 239/585 |
| 4,509,693 | 4/1985 | Nakai | 239/585 |
| 4,520,962 | 6/1985 | Momono et al. | 239/585 |
| 4,572,436 | 2/1986 | Stettner et al. | 239/585 |
| 4,621,772 | 11/1986 | Blythe et al. | 239/585 |
| 4,646,974 | 3/1987 | Sofianek et al. | 239/585 |
| 4,666,088 | 5/1987 | Krauss et al. | 239/585 |
| 4,699,323 | 10/1987 | Rush et al. | 239/585 |
| 4,718,635 | 1/1988 | DeConcini et al. | 239/585 |
| 4,753,393 | 6/1988 | Sausner | 239/467 |
| 4,771,984 | 9/1988 | Szablewski et al. | 239/585 |

Primary Examiner—Andres Kashnikow
Assistant Examiner—Michael J. Forman
Attorney, Agent, or Firm—Edwin E. Greigg

[57] ABSTRACT

A fuel injection valve and a method for adjusting its fuel quantity are proposed. The fuel injection valve is used to inject fuel into the intake system of a mixture-compressing internal combustion engine having externally supplied ignition. It has a valve needle, which when a magnet coil is excited is attracted toward a core by an armature connected to the valve needle, whereupon the valve needle with a sealing seat formed on it, lifts away from a valve seat face embodied on a nozzle body. According to the invention, the nozzle body is closed off by a bottom embodied in the form of a small plate, which is part of the nozzle body and in which a plurality of calibrated injection ports are located. The closure of the valve needle is embodied by a tang, which extends as far as the immediate vicinity of the bottom. The injection ports are produced by erosion thereof, while their calibration for the sake of static fuel quantity adaptation is performed by hydraulic grinding with a flowable grinding medium.

8 Claims, 2 Drawing Sheets

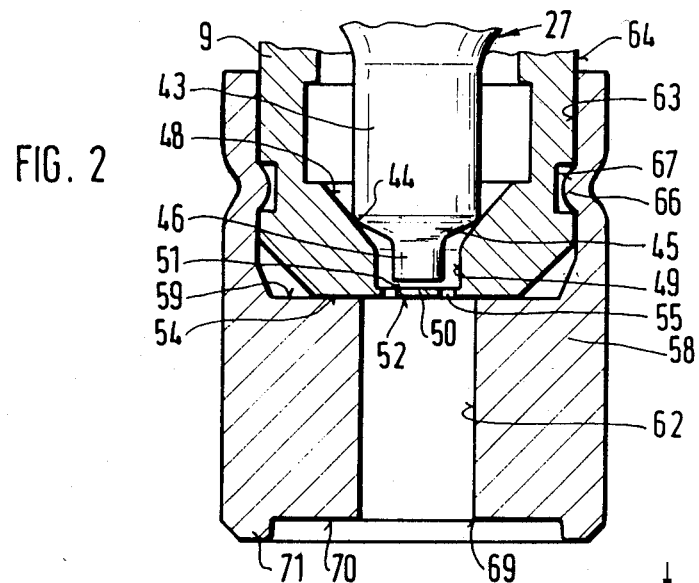
FIG. 2
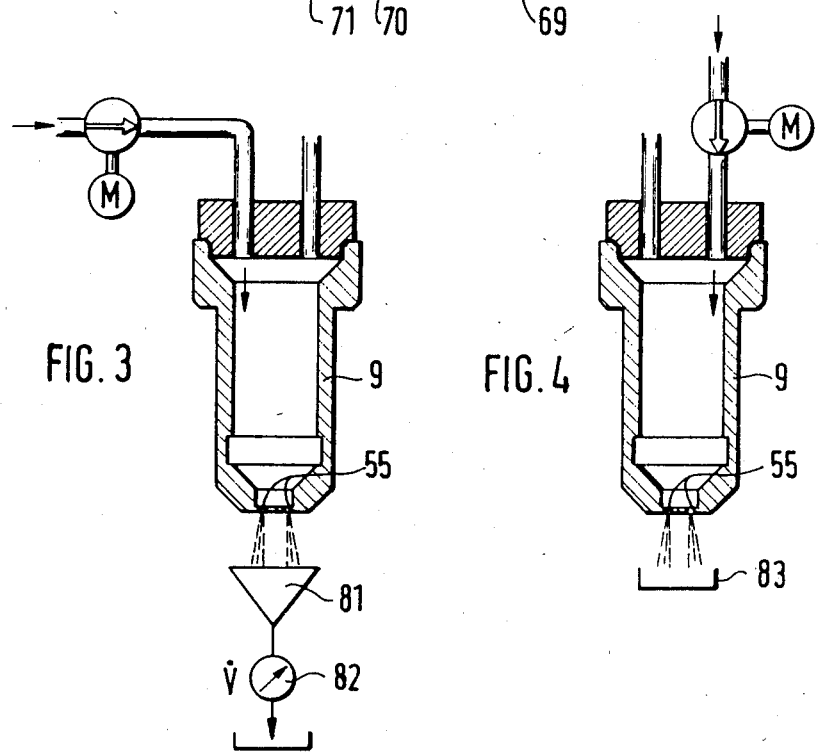
FIG. 3
FIG. 4

FUEL INJECTION VALVE AND METHOD FOR ADJUSTING IT

BACKGROUND OF THE INVENTION

The invention is directed to improvements in a fuel injection valve, and a method for adjusting the valve.

In most of the known fuel injection valves, the fuel is prepared via a tang protruding from the valve, or by a swirling preparation by means of swirl-generated openings. Another kind of fuel preparation is also known, in which the fuel downstream of a sealing seat is directed onto a thin plate (known as a director plate) provided with a plurality of aligned injection ports of a defined length-to-width ratio. Downstream of this plate that performs the fuel quantity metering, there may also be a further injection port. To secure the plate, a preparation sleeve receiving the injection port may be braced against a nozzle body of the fuel injection valve, with the plate disposed in between.

Such a fuel injection valve, which is described in European Pat. No. 201 190, is very expensive to manufacture and individually adjust, because for proper function, the characteristic dimensions of the nozzle body and the plate must be adapted precisely to one another. Eccentricities between these two parts, in particular, have a deleterious effect on the injection pattern attainable. Adapting the fuel quantity, which is dependent on the diameter and length of the injection ports and must be performed individually for each fuel injection valve, is also difficult, because the small dimensions of the plate make it hard to handle.

OBJECT AND SUMMARY OF THE INVENTION

It is a principal object of the invention to provide a fuel injection valve having the advantage over the prior art that it is simpler to manufacture, because the valve seat body and the plate are combined in a single component, so that eccentricities between them are precluded.

Another object and advantage in adapting the quantity of the fuel injection valve is attained by using a hydraulic grinding method for grinding the injection ports which permits highly precise adjustment of the static injection quantity of the fuel injection valve at relatively little expense.

A further object and a particularly advantageous feature is the use of a sleeve that can be fastened in front of the fuel injection valve, simultaneously both mechanically protecting the valve and shaping the injected fuel stream. In contrast to the known fuel injection valve, the sleeve is not used for fastening the plate, so that the tedious machining of the various fitting faces can be dispensed with.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 2 is a partial detail of FIG. 1 on a larger scale;

FIGS. 3 and 4 schematically illustrate a method for adjusting the static flow quantity of a fuel injection valve.

DESCRIPTION OF THE PREFERRED EMBODIMENT

Figures 1, 5:
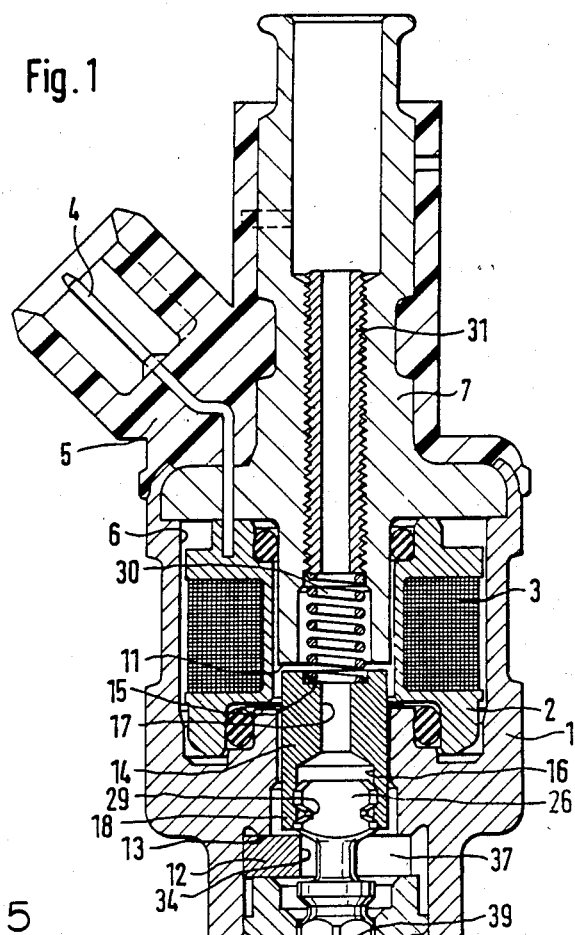
FIG. 1 shows a fuel injection valve according to the invention, in simplified fashion.
FIG. 5 is a cross section of the bottom of the housing and tang to illustrate the bottom plate with tangential and radial bores therein.

The fuel injection valve shown by way of example in the drawing, for a fuel injection system of a mixture-compressing internal combustion engine having externally supplied ignition, has a valve housing 1 made of ferromagnetic material, in which a magnet coil 3 is disposed on a coil holder 2. The magnet coil 3 has an electric current supply means in the form of a plug connection 4, which is embedded in a plastic ring 5 that partly encompasses the valve housing 1.

The coil holder 2 of the magnet coil 3 is seated in a coil chamber 6 of the valve housing 1 on a fitting 7, that protrudes partway into the valve housing 1. The fitting 7 includes an axial passage that delivers the fuel, such as gasoline. The valve housing 1 partly surrounds a nozzle body 9, remote from the fitting 7 and secures the nozzle body 9 to the end of the valve housing.

A cylindrical armature 14 is located between an end face 11 of the fitting 7 and a stop plate 12, which is mounted between an upper face of nozzle body 9 and an inner shoulder 13 of the valve housing 1. The stop plate has a predetermined thickness for the sake of accurate adjustment of the valve. The armature 14 comprises a corrosion-resistant magnetic material and is located spaced radially slightly apart from a magnetically conductive step of the valve housing 1, thereby forming an annular magnet gap, coaxially in the valve housing 1, between the armature 14 and the step. The cylindrical armature 14 is provided with a first and second blind bore 15 and 16, in order beginning at its two end faces; the second blind bore 16 opens toward the nozzle body 9. The first and second blind bores 15 and 16 communicate with one another through a coaxial opening 17. The diameter of the opening 17 is smaller than the diameter of the second blind bore 16. The end portion of the armature 14 oriented toward the nozzle body 9 is embodied as a deformation zone 18. A retaining body 26 that fills the second blind bore 16 forms an upper end of a valve needle 27 which is gripped by the second blind bore 16 to join the armature 14 and the valve needle 27 in a form-fitting manner. The encompassing grip on the retaining body 26 by the deformation zone 18 is attained by pressing material comprising the deformation zone 18 into grooves 29 located on the retaining body 26.

A compression spring 30 rests with one end on the bottom of the first coaxial blind bore 15 with the other end supported on a tubular insert 31 secured in the fitting 7 by a screw connection or by bracing. The tubular insert 31 and compression spring exerts a force directed away from the fitting 7 upon the armature 14 and the valve needle 27.

With radial spacing, the valve needle 27 passes through a bore 34 in the stop plate 12 and is guided in a guide bore 35 of the nozzle body 9. In the stop plate 12, a radial recess 37 leading from the through bore 34 to the circumference of the stop plate 12 is provided, the inside diameter of the recess being greater than the diameter of the valve needle 27 in the region thereof surrounded by the stop plate 12.

The valve needle 27 has two enlarged guide sections 39 and 40, which guide the valve needle 27 in the guide bore 35 and the guide sections are for example embodied as squares or pentagons to leave a spacing for an axial passage for the fuel.

The second guide section 40, downstream of the first, is adjoined by a cylindrical section 43 of smaller diameter. The cylindrical section 43 in turn merges via a sealing seat 44 with a conical section 45, which terminates in a coaxial, preferably cylindrical tang 46.

In FIG. 2, showing a detail of FIG. 1, it can be seen that the transition between the cylindrical section 43 and the conical section 45 is rounded—approximately in the form of a radius—and forms the sealing seat 44, which in cooperation with a conical valve seat face 48 machined into the surface of the nozzle body 9 effects an opening or closing of the fuel injection valve. The conical valve seat face 48 of the nozzle body 9 continues, in the direction remote from the armature 14, in the form of a cylindrical blind bore 49, the depth of which is approximately equal to the length of the tang 46, so that an annular gap of constant cross section remains between the jacket face of the cylindrical blind bore 49 and the cylindrical tang 46. The transitions between the conical valve seat face 48 on the one hand and the blind bore 49 on the other, as well as between the conical section 45 of the valve needle 27 on the one hand and the tang 46 on the other, are rounded, in order to assure a good flow course. The cylindrical blind bore 49 is closed by a bottom 50, which has an inner wall 51, oriented toward the valve needle 27, and an outer wall 52 remote from the valve needle 27; at least the outer wall 52 is embodied as entirely plane and forms part of an end face 54 of the nozzle body 9 remote from the armature 14. Preferably the inner wall 51 is also entirely plane, lending the bottom 50 the shape of a flat plate.

Located in the bottom 50 is a plurality of injection ports 55, see FIG. 5, which extend from upstream to downstream of the bottom 50. Upstream of the bottom 50, the injection ports 55 begin in the annular space formed between the blind bore 49 and the tang 46. The center axes of the injection ports 55 are preferably not axially oriented but instead extend at an incline to the longitudinal axis of the fuel injection valve, with both a radial and a tangential component with respect to the longitudinal axis, that is an extension of the injection parts would not extend through the longitudinal axis but would be at a tangent to the axis.

With a shoulder 59, a sleeve 58 rests on the end face 54 of the nozzle body 9. The shoulder 59 embodies a transition, in the form of a step, between a fuel flow discharge passage through which fuel is discharged from the valve assembly or preparation bore 62 of smaller diameter, which opens axially outward, and a receiving bore 63 of larger diameter which surrounds and receives the lower end portion of the nozzle body 9. With the receiving bore 63, the sleeve 58 encompasses an outer jacket face 64 of the nozzle body 9 over a portion of its length and is secured on the nozzle body 9 by crimping the material comprising the sleeve 58 inward at 66 toward an annular groove 67 in the outer jacket face 64 of the nozzle body 9. The preparation bore 62 has a cylindrical or conically enlarging shape and merges downstream via an edge 69, with a step 70. The step 70 is formed by a protruding collar 71, which is a part of the fuel injection valve that protrudes outward the farthest and serves to protect the fuel injection valve from mechanical damage.

The sleeve 58 is preferably of aluminum, but since it does not have any fitting faces that must function precisely, and since no special demands for mechanical stability are made of it, it may also be manufactured from a nonmetal material, such as plastic.

Depending on the intended use of the fuel injection valve, it may be suitable to utilize the edge 69 as a preparation edge, at which the fuel streams emerging from the injection ports 55 are aimed. This enables good atomization of the fuel.

The function of the fuel injection valve is as follows:

When current flows through the magnet coil 3, the armature 14 is attracted toward the fitting 7. With its sealing seat 44, the valve needle 27, which is firmly joined to the armature 14, lifts away from the conical valve seat face 48; a flow cross section is thereby opened up between the sealing seat 44 and the conical valve seat face 48, so that the fuel flows through the annular space located between the blind bore 49 and the tang 46 to reach the injection ports 55. Fuel flows through the injection ports 55 with a large pressure drop, since these ports embody the narrowest cross section inside the fuel injection valve. The size of the injection ports 55 accordingly determines the flow quantity of injected fuel; to those skilled in the art, this is known as "metering". The length of the tang 46 is dimensioned such that its end face is located in the immediate vicinity of the inner wall 51 of the bottom 50, when the fuel injection valve is closed. The tang 46 serves to reduce the volume between the sealing seat 44 and the bottom 50 and to guide the fuel flow in the direction of the injection ports 55.

Since it is critical to the fuel metering adhere precisely to the required size of the injection ports 55, calibration of the injection ports 55 assumes great significance. After manufacture of the injection ports 55 by an erosion process, for instance using silver wire, the final calibration of the injection ports 55 is therefore performed by means of hydraulic grinding.

FIG. 3 shows how a test fluid flows at a predetermined pressure through the nozzle body 9, already provided with the eroded injection ports 55; this fluid is caught in a collecting container 81, and the quantity flowing through per unit of time is ascertained by a volume measuring instrument 82. On the basis of a comparison between a set point and the actual value, the quantity of test flid flowing through determines the duration of the ensuring hydraulic grinding. The process of hydraulic grinding itself is illustrated in FIG. 4. A grinding paste, or a fluid provided with grinding additives, is forced under pressure into the nozzle body 9 and escapes via the injection ports 55 into a collecting container 83. The grinding medium as it flows through removes material from the jacket faces of the injection port 55, thereby enlarging them. The hydraulic grinding also progressively rounds the edges of the injection ports 55, which improves the flow through the injection ports 55 during operation of the fuel injection valve. Once the hydraulic grinding has been performed, the static flow quantity can be ascertained once again by means of the test fluid. If there is still a deviation from the set-point value, the hydraulic grinding is repeated.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A fuel injection valve comprising a housing, a magnet coil disposed in said housing, an armature that can be acted upon by the force of the magnet coil, a nozzle body secured to said housing, said nozzle body including a valve seat having a valve seat face, a valve closing element (27) connected to said armature which in combination with said valve seat face controls an opening or closing of said fuel injection valve, said valve closing element being guided by interior walls of said nozzle body, a plate located downstream of said valve seat, a plurality of injection ports (55) in said plate, said plate and said nozzle body (9) being formed as a single component and said plate being embodied as a thin-walled bottom (50) of said single component and having inner and outer walls 51 and 52, respectively, said valve closing element terminating upstream of said inner wall of said plate.

2. A fuel injection valve as defined by claim 1, in which said outer wall (52) of said thin-walled bottom (50) remote from the valve closing element (27) simultaneously embodies part of an end face (54) of said nozzle body (9) and forms a plane surface.

3. A fuel injection valve as defined by claim 2, which includes a sleeve (58) that can be fastened to the nozzle body (9) and which is provided with a preparation bore (62) extending axially downstream of the bottom (50).

4. A fuel injection valve as defined by claim 3, in which said sleeve (58) is fastened to said nozzle body (9) by crimping a portion of said sleeve bracing.

5. A fuel injection valve as set forth in claim 1, which includes a stop plate (12) between an end face of said nozzle body and an inner shoulder (13) of said housing, said stop plate having a specific thickness for accurate adjustment of the nozzle body valve seat relative to said valve needle.

6. A fuel injection valve as defined by claim 1, in which said valve closing element (27) includes a tang (46) which terminates just upstream of the bottom (50).

7. A fuel injection valve as set forth in claim 6, which includes a stop plate (12) between and end face of said nozzle body and an inner shoulder (13) of said housing, said stop plate having a specific thickness for accurate adjustment of the nozzle body valve seat relative to said valve needle.

8. A fuel injection valve as set forth in claim 7, wherein said plate includes at least two injection ports extending from upstream to downstream with the upstream end beginning in an annular space between said tang and said plate, the axes of said ports extending at an incline away from the longitudinal axis of the fuel injection valve both radially and tangentially with respect to the longitudinal axis.

* * * * *